Patented Jan. 19, 1932

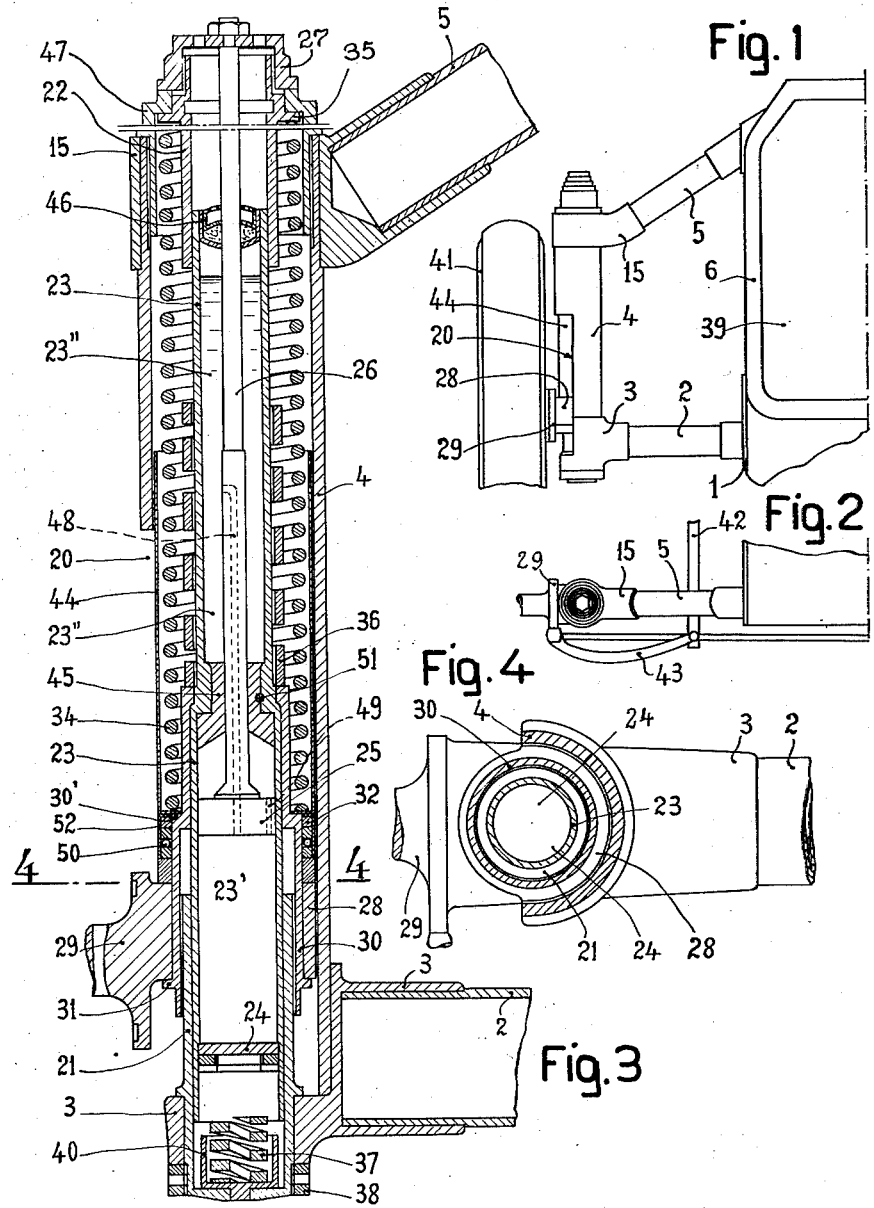

1,842,273

UNITED STATES PATENT OFFICE

VINCENZO LANCIA, OF TURIN, ITALY

MEANS FOR MOUNTING WHEELS IN VEHICLES

Application filed July 2, 1928, Serial No. 289,866, and in Italy July 23, 1927.

The present invention relates to automotive vehicles in which the front wheels are mounted to move, independently from each other, for suspension purposes, at the two sides of a rigid transverse frame fastened on the vehicle main frame or structure.

This invention has for its object means for mounting each front wheel pivot or fuse to move with respect to said transverse frame carrying it, for suspension and steering purposes.

On the annexed drawings is illustrated by way of example an embodiment of this invention and:

Figure 1 shows in front view one half of the front end of a motor car in which the front wheels are mounted in accordance with this invention;

Figure 2 is a fragmentary plan view of the same;

Figure 3 shows supporting means for one wheel in central section and on enlarged scale;

Figure 4 is a fragmentary plan section on line 4—4 of Figure 3.

As shown in Figures 1 and 2 a transverse frame intended to support a front wheel is fastened on the side of the main frame or structure of the vehicle, and it consists of a bottom cross bar 2 and of a top stay or inclined bar 5 which are connected respectively with the bottom and top ends of a vertical hollow post 4 by means of sockets 3 and 15. Said bars are fastened on the vehicle frame 1 and on a frame 6 embracing the engine radiator 39 and of course this structure is duplicated on the other side of the vehicle (not shown).

The said post consists of a tubular member 4 encircled at its ends by collars of sockets 3 and 15 and fastened in position by a sleeve 47 screwed in the top end of hollow post 4 and engaging collar of socket 15; said post has on its outer side an opening 20 which extends along about the lower half portion of the post. A hollow member 23 is mounted to slide within hollow post 4 and concentric therewith, by means of end sleeves 21 and 22 fastened in hollow post 4 by means of collar 38 and cap 27; said hollow member 23 has its bottom closed by a plug 24 and provides as hereinafter described a liquid shock absorber in cooperation with a piston 25 connected by a stem 26 with top cap 27 of post 4, said piston reciprocating within the chamber 23' provided by a packing partition 45 in the hollow member 23. A packing and guiding collar 46 is located at the top of the hollow member 23 and it embraces for sliding seal the piston stem 26.

Ports 48 and 49 are provided in stem 26 and piston 25 and a suitable liquid is caused to circulate through spaces 23'—23'' of hollow member 23 by the cooperation of piston 25 and partition 45.

Hollow member 23 could be stationary without providing a liquid shock absorber, being only necessary that it provides for mounting thereon and within post 4 a collar 28 carrying a pivot or fuse 29 for one wheel, said collar 28 being able of rotating around the axis of post 4 and of sliding vertically along the same.

In the construction illustrated the collar 28 is loose on a sleeve 30 intermediate a flange 31 of sleeve 30 and a ball bearing 50 held in position by a clamping ring 32, and sleeve 30 is engaged by a pin 51 with the hollow member 23 which is thus caused to move vertically with the collar 28 and pivot 29 for wheel 41.

On ring 32 and on a cooperating shoulder 30' of sleeve 30 bears the bottom end of coil spring 34 whose top end abuts on a flange 35 of sleeve 22 fastened within post 4; on the top portion of the sleeve 30 abuts the bottom end of a shorter cylindrical coil spring 36, said spring 36 being intended to engage the edge of the sleeve 22 in the progression of the upward stroke of hollow member 23 after spring 34 is entirely compressed.

The downward stroke of the parts 29—28—23 is resiliently restricted by a spring 37 carried by a cup 40 mounted in the bottom of socket 3.

Protecting covers 44 and 52 arranged to move freely within bottom of the hollow post 4 protect the device parts.

The resilient mounting of the collar 28 with respect to post 4 could also be made in a different manner adapted to secure to wheel pivot 29 the necessary freedom for movement in vertical direction and for wheel steering oscillations around the axis of post 4, said pivot 29 extending through opening 20 of post 4.

In operation collar 28 with pivot 29 supporting wheels 41 is free to rotate around the axis of post 4 for steering movements which are imparted to said parts by conventional members as 42 and 43.

The vertical movements of the wheel and parts connected therewith for resilient suspension are damped by springs 34—36 in upward stroke and by the operation of the liquid shock absorber the stroke of member 23 with respect to piston 25 being counteracted by the flow of liquid through ports 48 and 49; the downward stroke of parts is damped by said liquid damper and finally by spring 37 which is engaged by the bottom plug 24 of member 23 at the end of the downward stroke.

By the described arrangement the supporting member for the wheel is enclosed within the post of the transverse frame and the construction is strong in its whole and it removes lateral stresses which would be operative should the wheel be mounted on a separate part at a side of and spaced from said post 4.

Further as hollow member 23 solid in vertical direction with the collar 28 of the wheel pivot 29 is mounted to reciprocate within sleeve 21 which has one end fastened in the stationary bottom end of post 4 and extends within a portion of sleeve 30 on which is loose the collar 28 of the wheel pivot 29, no supporting or guiding contact being required between parts 21 and 30, the advantage is secured that the bottom surface of member 23 sliding within supporting sleeve 21 is protected against mud projections in spite of location of the parts in the vehicle structure.

What I claim as my invention and desire to secure by United States Letters Patent is:—

1. Means for mounting a wheel in a vehicle comprising a hollow post having a slot, means connecting said post with the vehicle structure, guiding means at the ends of said post, a member mounted to reciprocate with respect to said guiding means, a collar rotatable on said reciprocating member and engaged therewith in longitudinal direction, a wheel pivot solid with said collar and extending through said post slot and means resiliently opposing the longitudinal displacements of said reciprocating member collar and wheel pivot.

2. Means for mounting a wheel in a vehicle comprising a hollow post having a slot, means connecting said post with the vehicle structure, guiding means in said post, a member mounted to reciprocate with respect to said guiding means, a protecting member connected with said reciprocating member and extending over said guiding means, a collar rotatable on said reciprocating member and engaged therewith in longitudinal direction, a wheel pivot solid with said collar and extending through said post slot and means resiliently opposing the longitudinal displacements of said reciprocating member, collar and wheel pivot.

3. Means for mounting a wheel in a vehicle comprising a hollow post having a slot near one end, means connecting said post with the vehicle structure, a guiding member in said post near its slotted end, a guiding member in said post near its other end, a member mounted to reciprocate with respect to and guided by said guiding means, a protecting member connected longitudinally with said reciprocating member and extending across said post slot over said first named guiding member, a collar rotatable on said protecting member and engaged in longitudinal direction with said protecting member and reciprocating member, a wheel pivot solid with said collar and extending through said post slot and means resiliently opposing the longitudinal displacement of said reciprocating member, collar and wheel pivot.

4. Means for mounting a wheel in a vehicle comprising a hollow post having a slot, means connecting said post with the vehicle structure, guiding means in said hollow post, a hollow member slidably mounted in said guiding means, a wheel pivot carried by a said hollow member and extending through said post slot, a bored partition and a piston in said hollow member, means extending through said partition bore to connect said piston with said post, said piston and its connecting means being provided with ports leaving a controlled passage for a liquid contained within said hollow member to damps the longitudinal movements of said hollow member in said guiding means, and resilient means between said hollow member and post.

5. Means for mounting a wheel in a vehicle comprising a hollow post having a slot near one end, means connecting said post with the vehicle structure, a guiding sleeve in said post near its slotted end, a guiding sleeve in said post near its other end, a hollow member having its ends guided in said sleeves, a protecting member connected with said hollow member and extending over said first named guiding sleeve, a wheel pivot mounted on said protecting member and extending through said post slot, a bored partition and a piston in said hollow member, means extending through said partition bore to connect said piston with said post, said piston and its connecting means being provided with ports leaving a controlled passage for a liquid contained within said hollow member to damp the longitudinal movements of said hollow member in said guiding means, and resilient means between said hollow member and post.

6. Means for mounting a wheel in a vehicle comprising a hollow, unitary post having a slot intermediate its ends, means rigidly connecting said post with the vehicle structure, guiding means at each end of said post, a member mounted to reciprocate with respect to said guiding means, a collar on said member and engaged therewith in longitudinal direction, said collar being rotatable with respect to said post, a wheel pivot solid with said collar and extending through said post slot, and means resiliently opposing the longitudinal displacements of said reciprocating member, collar, and wheel pivot.

7. Means for mounting a wheel in a vehicle comprising a hollow post having a slot intermediate its ends, means rigidly connecting said post with the vehicle structure, guiding means at each end of said post, the lower one of said guiding means being exposed by said slot, a member mounted to reciprocate with respect to said guiding means, a protecting member connected with said reciprocating member and extending over the lower one of said guiding means, a collar on said protecting member and engaged therewith in longitudinal direction, said collar being rotatable with respect to said post, a wheel pivot solid with said collar and extending through said post slot, and means resiliently opposing the longitudinal displacements of said reciprocating member, collar, and wheel pivot.

8. Means for mounting a wheel in a vehicle comprising a hollow post having a slot intermediate its ends and near one end, means rigidly connecting said post with the vehicle structure, a guiding member in said post near its slotted end, a guiding member in said post near its other end, a member mounted to reciprocate with respect to and guided by said guiding means, a protecting member connected longitudinally with said reciprocating member and extending across said post slot over said first named guiding member, a collar on said protecting member and engaged in longitudinal direction with said protecting member and reciprocating member, said collar being rotatable with respect to said post, a wheel pivot solid with said collar and extending through said post slot, and means resiliently opposing the longitudinal displacement of said reciprocating member, collar, and wheel pivot.

9. Means for mounting a wheel in a vehicle comprising a hollow post having a slot intermediate its ends, means rigidly connecting said post with the vehicle structure, guides at the top and bottom ends of said post, a wheel pivot extending through said post slot, hollow means mounted in said guides and supporting said pivot, said supporting means providing for angular and longitudinal movements of said pivot in said post, the said hollow means defining two liquid chambers, and a slotted piston connected to said top guide and movable in said hollow means for damping said longitudinal movements of said pivot supporting means.

10. Means for mounting a wheel in a vehicle comprising a hollow post having a slot intermediate its ends, means rigidly connecting said post with the vehicle structure, guides at the top and bottom ends of said post, a wheel pivot extending through said post slot, means mounted in said guides and supporting said pivot, said means being in spaced relation with respect to the post, said supporting means providing for angular and longitudinal movements of said pivot in said post, a protecting member carried by said supporting means and extending over said bottom end guide in said post, and means for damping said longitudinal movements of said pivot supporting means.

11. Means for mounting a wheel in a vehicle, comprising a hollow post having a slot intermediate its ends and near one end, means rigidly connecting said post with the vehicle structure, a guiding member in said post near its slotted end, a guiding member in said post near its other end, a wheel pivot extending through said post slot, means mounted in said guiding members for supporting said pivot, said supporting means cooperating with said guiding members to provide for angular and longitudinal movements of said pivot in said post, a protecting member carried by said supporting means and extending across said post slot over said first named guiding member, and means for damping the longitudinal displacement of said pivot supporting means.

In testimony whereof I have signed my name to this specification.

VINCENZO LANCIA.